(12) United States Patent
Chaudhury et al.

(10) Patent No.: US 8,848,802 B2
(45) Date of Patent: Sep. 30, 2014

(54) SYSTEM AND METHOD FOR OBJECT BASED PARAMETRIC VIDEO CODING

(75) Inventors: Santanu Chaudhury, New Delhi (IN); Mona Mathur, Delhi (IN); Aditya Khandelia, Madhya Pradesh (IN); Subarna Tripathi, Karnataka (IN); Brejesh Lall, New Delhi (IN); Sumantra Dutta Roy, New Delhi (IN); Saurabh Gorecha, Chennai (IN)

(73) Assignee: STMicroelectronics International N.V., Amsterdam (NL)

( * ) Notice: Subject to any disclaimer, the term of this patent is extended or adjusted under 35 U.S.C. 154(b) by 771 days.

(21) Appl. No.: 12/554,579

(22) Filed: Sep. 4, 2009

(65) Prior Publication Data

US 2011/0058609 A1    Mar. 10, 2011

(51) Int. Cl.

| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/139* | (2014.01) |
| *H04N 19/14* | (2014.01) |
| *H04N 19/20* | (2014.01) |
| *H04N 19/132* | (2014.01) |
| *H04N 19/17* | (2014.01) |
| *H04N 19/12* | (2014.01) |
| *H04N 19/61* | (2014.01) |
| *H04N 19/159* | (2014.01) |
| *G06T 7/20* | (2006.01) |
| *H04N 19/436* | (2014.01) |

(52) U.S. Cl.
CPC ... *H04N 19/00521* (2013.01); *H04N 19/00151* (2013.01); *H04N 19/00157* (2013.01); *H04N 19/00387* (2013.01); *H04N 19/00127* (2013.01); *G06T 2207/10016* (2013.01); *H04N 19/0026* (2013.01); *H04N 19/00078* (2013.01); *H04N 19/00781* (2013.01); *H04N 19/00218* (2013.01); *G06T 7/2006* (2013.01)
USPC ........................................................ 375/240.25

(58) Field of Classification Search
None
See application file for complete search history.

(56) References Cited

U.S. PATENT DOCUMENTS

| | | | | |
|---|---|---|---|---|
| 5,057,940 | A | * | 10/1991 | Murakami et al. ............ 382/243 |
| 6,304,295 | B1 | * | 10/2001 | Krishnamurthy et al. . 348/420.1 |
| 2001/0019631 | A1 | * | 9/2001 | Ohsawa et al. ................ 382/242 |
| 2003/0117585 | A1 | * | 6/2003 | Lee ................................ 352/244 |

(Continued)

OTHER PUBLICATIONS

Zhu et al., "Video Coding with Spatio-Temporal Texture Synthesis", 2007, IEEE, pp. 112-115.*

(Continued)

*Primary Examiner* — Ayaz Sheikh
*Assistant Examiner* — Peter Chau
(74) *Attorney, Agent, or Firm* — Seed IP Law Group PLLC

(57) ABSTRACT

A video compression framework based on parametric object and background compression is proposed. At the encoder, an embodiment detects objects and segments frames into regions corresponding to the foreground object and the background. The object and the background are individually encoded using separate parametric coding techniques. While the object is encoded using the projection coefficients to the orthonormal basis of the learnt subspace (used for appearance based object tracking), the background is characterized using an auto-regressive (AR) process model. An advantage of the proposed schemes is that the decoder structure allows for simultaneous reconstruction of object and background, thus making it amenable to the new multi-thread/multi-processor architectures.

21 Claims, 12 Drawing Sheets

(56) References Cited

U.S. PATENT DOCUMENTS

| | | | | |
|---|---|---|---|---|
| 2005/0286764 | A1* | 12/2005 | Mittal et al. | 382/181 |
| 2006/0222076 | A1* | 10/2006 | Ludvig et al. | 375/240.16 |
| 2008/0123747 | A1* | 5/2008 | Lee et al. | 375/240.16 |
| 2013/0231940 | A1* | 9/2013 | Ehara | 704/500 |

OTHER PUBLICATIONS

ISO/IEC International Standard, "Information technology—Coding of audio-visual objects—Part 2: Visual," ISO/IEC 14496-2, Second edition, Dec. 1, 2001, 536 pages.

International Telecommunication Union, "Annex G of the H.264 standard—Series H: Audiovisual and Multimedia Systems; Infrastructure of audiovisual services—Coding of moving video; Advanced video coding for generic audiovisual services," ITU-T Telecommunication Standardization Sector of ITU, Recommendation ITU-T H.264, Mar. 2010, 214 pages.

International Telecommunication Union, "Series H: Audiovisual and Multimedia Systems; Infrastructure of audiovisual services—Coding of moving video; Advanced video coding for generic audiovisual services," ITU-T Telecommunication Standardization Sector of ITU, Recommendation ITU-T H.264, Mar. 2009, 670 pages.

Black et al., "EigenTracking: Robust Matching and Tracking of Articulated Objects Using a View-Based Representation," *International Journal of Computer Vision* 26(1):63-84, 1998.

Black et al., "A framework for Modeling Appearance Change in Image Sequences," *Proc. Sixth International Conference on Computer Vision*, Jan. 4-7, 1998, pp. 660-667.

Boliek et al. (eds.), ISO/IEC JTC 1/SC 29/WG 1 (ITU-T SG8) Coding of Still Pictures, "JPEG 2000 Part I Final Committee Draft Version 1.0," N1646R, Mar. 16, 2000, 205 pages.

Boliek et al. (eds.), ISO/IEC JTC 1/SC 29/WG 1 (ITU_T SG8) Coding of Still Pictures, "JPEG 2000 Part II Final Committee Draft," N2000, Dec. 7, 2000, 351 pages.

Chaudhury et al., "Advance Video Coding With Perceptual Quality Scalability for Regions of Interest," U.S. Appl. No. 13/341,697, filed Dec. 30, 2011, 111 pages.

Jepson et al., "Robust Online Appearance Models for Visual Tracking," *IEEE Transactions on Pattern Analysis and Machine Intelligence* 25(10):1296-1311, Oct. 2003.

Khan et al., "A Rao-Blackwellized Particle Filter for EignTracking," *Proceedings of the 2004 IEEE Computer Society Conference on Computer Vision and Pattern Recognition* 2:II-980-II-986, Jun. 27-Jul. 2, 2004.

Lim et al., "Incremental Learning for Visual Tracking," *Proc. NIPS'05*, 2005. pp. 793-800.

Lin et al., "Adaptive Discriminative Generative Model and Its Applications," *Proc. NIPS'04*, 2004, pp. 801-808.

Ross et al., "Adaptive Probabilistic Visual Tracking with Incremental Subspace Update," *Proc. ECCV '04*, 2004, pp. 470-482.

Roth et al., "Survey of Appearance-Based Methods for Object Recognition," Technical Report, ICG-TR-01/08, Graz, Jan. 15, 2008, 68 pages.

Skočaj et al., "Weighted and Robust Incremental Method for Subspace Learning," *Proceedings of the Ninth IEEE International Conference on Computer Vision*, Oct. 13-16 2003, 8 pages.

Szummer, "Temporal Texture Modeling," Master's Thesis, Massachusetts Institute of Technology, Sep. 1995, 57 pages.

Szummer et al., "Temporal Texture Modeling," *Proceedings of the International Conference on Image Processing*, Sep. 16-19, 1996, 3:823-826, 1996.

Tripathi et al., "Advance Video Coding With Perceptual Quality Scalability for Regions of Interest," U.S. Appl. No. 13/341,687, filed Dec. 30, 2011, 112 pages.

Van Leuven et al., "An Implementation of Multiple Region-Of-Interest Models in H.264/AVC," SITIS, 2006, 10 pages.

Zheng et al., "H.264 ROI Coding Based on Visual Perception," The Institute of Engineering and Technology, VIE 08, 2008, 6 pages.

Doucet et al. (eds.), "Sequential Monte Carlo Methods in Practice," Springer-Verlag, N.Y., 2001.

Agarwal et al., "An Innovative Approach for Adaptation of Generic Rate Control Algorithms for Target Video Standards," Proceedings of the IEEE International Conference on Signal Processing and Communications (ICSPC), Dubai, United Arab Emirates, Nov. 24-27, 2007.

Chaudhury et al., "Paremetric Video Compression using Appearance Space," IEEE, 2008, 4 pages.

Gupta et al., "On Line Predictive Appearance-Based Tracking," IEEE International Conference on Image Processing (ICIP), 2004, pp. 1041-1044.

Hakeem et al., "An Object-based Video Coding Framework for Video Sequences Obtained From Static Cameras," Proceedings of the 13th Annual ACM International Conferene on Multimedia, Singapore, 2005, pp. 608-617.

Ho et al., "Visual Tracking Using Learned Linear Subspaces," Proceedings of the IEEE Computer Society Conference on Computer Vision and Pattern Recognition (CVPR), 2004, 8 pages.

Isard et al., "Condensation-Conditional Density Propagation for Visual Tracking," International Journal of Computer Vision, 29(1):5-28, 1998.

Khandelia et al., "Parametric Video Compression Scheme Using AR Based Texture Synthesis," IEEE Sixth Indian Conference on Computer Vision, Graphics & Image Processing, Bhubaneswar, India, Dec. 16-19, 2008, pp. 219-225.

Ndjiki-Nya et al., "Improved H.264/AVC Coding Using Texture Analysis and Synthesis," Proceedings of the International Conference on Image Processing (ICIP), IEEE vol. 3, Barcelona, Catalonia, Spain, Sep. 14-18, 2003, pp. III-849-III-852.

Patwardhan et al., "Hand Gesture Modelling and Recognition Involving Changing Shapes and Trajectories, Using a Predictive EigenTracker," 10 pages, Apr. 9, 2006.

Tripathi et al., "Online Improved Eigen Tracking," Proceedings of the International Conference on Advances in Pattern Recognition (ICAPR), 2009, pp. 278-281.

Weng et al., "Candid Covariance-Free Incremental Principal Component Analysis," IEEE Transactions on Pattern Analysis and Machine Intelligence, 25(8):1034-1040, Aug. 2003.

Zhang et al., "Convergence Analysis of Complementary Candid Incremental Principal Component Analysis," A Technical Report of Computer Science Department at Michigan State University, Aug. 2001, pp. 1-7.

Zhu et al., "Video Coding With Spatio-Temporal Texture Synthesis and Edge-Based Inpainting," Proceedings of the IEEE International Conference on Multimedia and Expo (ICME), IEEE, Hannover, Germany, Jun. 23-26, 2008, pp. 813-816.

\* cited by examiner

SYSTEM AND METHOD FOR OBJECT BASED PARAMETRIC VIDEO CODING

BACKGROUND

1. Technical Field

The present disclosure relates to video encoder and decoder systems and related methods, including video compression systems and methods.

2. Description of the Related Art

Video compression is commonly achieved by removing redundancy in the frequency, spatial and temporal domains. Standard coding techniques, such as predictive coding, transform coding and vector quantization, treat the image/video as random signals and exploit their stochastic properties to achieve compression. Such video compression schemes utilize prediction, motion compensation and transform-based approaches to remove inter-pixel redundancy. These schemes, however, do not efficiently take into account the perceptual redundancy present in background texture areas.

Object-based video compression has been proposed which tracks an object using parameters and then learns its appearance for coding. See A. Hakeem, K. Shafique, M. Shah, "An object-based video coding framework for video sequences obtained from static cameras", MM-05, pp. 608-617, 2005. This approach was designed for compression of scenes recorded with a static camera. It does not handle background efficiently.

BRIEF SUMMARY

This disclosure proposes a framework for integrating object and background coding to achieve higher compression as compared to current standards.

The disclosure includes embodiments of encoders and decoders of an object based parametric compression method. In an embodiment, an encoder detects objects and segments frames into regions corresponding to the foreground object and the background. The object and the background are individually encoded using separate parametric coding techniques. While the object is encoded using the projection coefficients to the orthonormal basis of the learnt subspace (used for appearance based object tracking), the background is characterized using an auto-regressive (AR) process model. An advantage of an embodiment is that a decoder structure allows for simultaneous reconstruction of object and background, thus making it amenable to multithread/multi-processor architectures.

An embodiment may exploit the perceptual redundancy across frames in the appearance of objects and textures present to attain higher compression rates. The background in many videos includes of one or more texture regions which can be efficiently compressed by using schemes for parametric texture representation. Besides this significant compression gains can be achieved by choosing appearance based object coding. Another significant advantage of object-based video coding is that embodiments may be configured to assign different priorities to different objects and the background thus permitting a choice of coding bit-rate based on their significance.

In an embodiment, a digital video encoder comprises: a segmentation module configured to segment frames in a digital video sequence into object regions and background regions; an object parameter generator configured to generate object motion and appearance parameters based on segmented object regions; and an auto regressive model generator configured to generate an auto regressive background model based on segmented background regions. In an embodiment, the encoder further comprises an encoding module configured compress background I frames, wherein the segmentation module is configured to provide background I frames to the encoding module. In an embodiment, the encoder further comprises a block categorizer configured to categorize blocks in background P frames regions into edge blocks and non-edge blocks, wherein the encoding module is further configured to compress the edge blocks and the auto regressive model generator is configured to generate the auto regressive background model based on non-edge blocks of the segmented background regions. In an embodiment, the encoder further comprises a motion threader configured to generate motion thread information based on non-edge blocks of the segmented background region, wherein the auto regressive model generator is configured to generate the auto regressive background model based on the motion thread information. In an embodiment, the encoder further comprises a block removal module configured to remove the background blocks based on an error criteria. In an embodiment, the block categorizer comprises a gradient-based edge detector. In an embodiment, the object parameter generator comprises an object tracking module, a residual calculator and an H.264 I slice encoder and the object tracking module is configured to generate the object motion and appearance parameters based on the received object region information and a decoded object received from the residual calculator. In an embodiment, the encoding module comprises an H.264/AVG encoder.

In an embodiment, a method of encoding a video image sequence in a digital video encoder comprises: segmenting frames in the digital video sequence into object regions and background regions; generating object motion and appearance parameters based on segmented object regions; and generating auto regressive model parameters based on segmented background regions. In an embodiment, the method further comprises compressing background I frames using transform-based encoding. In an embodiment, the method further comprises compressing background I frames using H.264/AVC encoding. In an embodiment, the method further comprises categorizing blocks in background P frames into edge blocks and non-edge blocks, wherein the generating the auto regressive background model is based on non-edge blocks of the background P frames. In an embodiment, the method further comprises encoding the edge blocks using H.264/AVC encoding. In an embodiment, the method further comprises generating motion thread information based on non-edge blocks of the background P frames. In an embodiment, the categorizing blocks comprises gradient-based edge detection. In an embodiment, the generating object motion and appearance parameters comprises calculating and compressing object residuals.

In an embodiment, a computer-readable memory medium's contents causes a processor to perform a method of encoding a video image sequence, the method comprising: segmenting frames in the digital video sequence into object regions and background regions; generating object motion and appearance parameters based on segmented object regions; and generating auto regressive model parameters based on segmented background regions.

In an embodiment, a digital video decoder comprises: a decoding block configured to decode background I frames in an encoded video sequence; an object appearance estimator configured to estimate an object appearance based on object appearance parameters in the encoded video sequence; and a texture synthesizer configured to generate background P blocks based on auto regressive coefficients and thread information in the encoded video sequence. In an embodiment, the decoder further comprises: an object correction module configured to modify the estimated object appearance based on object residual information in the encoded video sequence. In an embodiment, the decoder further comprises an object motion compensator configured to compensate for object motion based on object motion parameters in the encoded video sequence. In an embodiment, the decoding block is configured to decode edge blocks of background P-frames and the texture synthesizer is configured to generate background P frames based on the auto regressive coefficients, the thread information and the decoded edge blocks. In an embodiment, the decoder further comprises a demultiplexer configured to split the encoded video sequence into: encoded H.264 information; AR coefficients and thread information; and object appearance and motion parameters and compressed object residue information. In an embodiment, when an error criteria is satisfied, the texture synthesizer is configured to output a previous background P block as a current background P block.

In an embodiment, a method of decoding an encoded digital video sequence comprises: decoding background I frames in the encoded video sequence; estimating an object appearance based on object appearance parameters in the encoded video sequence; and generating background P frames based on auto regressive coefficients and thread information in the encoded video sequence. In an embodiment, the method further comprises: modifying the estimated object appearance based on object residual information in the encoded video sequence. In an embodiment, the method further comprises: compensating for object motion based on object motion parameters in the encoded video sequence. In an embodiment, the method further comprises: H.264/AVC decoding edge blocks of background P-frames, wherein the generating background P frames is based on the auto regressive coefficients, the thread information and the decoded edge blocks. In an embodiment, the method further comprises: demultiplexing the encoded video sequence into: encoded H.264/AVC information; AR coefficients and thread information; and object appearance and motion parameters and compressed object residue information. In an embodiment, when an error criteria is satisfied, generating a background P frame comprises outputting a previous background P block as a current background P block.

In an embodiment, a computer-readable memory medium's contents cause a processor to perform a method of decoding an encoded video image sequence, the method comprising: decoding background I frames in the encoded video sequence; estimating an object appearance based on object appearance parameters in the encoded video sequence; and generating background P frames based on auto regressive coefficients and thread information in the encoded video sequence. In an embodiment, the method further comprises: modifying the estimated object appearance based on object residual information in the encoded video sequence. In an embodiment, the method further comprises: compensating for object motion based on object motion parameters in the encoded video sequence. In an embodiment, the method further comprises: H.264/AVC decoding edge blocks of background P-frames, wherein the generating background P frames is based on the auto regressive coefficients, the thread information and the decoded edge blocks. In an embodiment, the method further comprises: demultiplexing the encoded video sequence into: encoded H.264/AVC information; AR coefficients and thread information; and object appearance and motion parameters and compressed object residue information. In an embodiment, the method further comprises: when an error criteria is satisfied, outputting a previous background P block as a current background P block.

In an embodiment, a system comprises: means for decoding background I frames in an encoded video sequence; means for estimating an object appearance based on object appearance parameters in the encoded video sequence; and means for generating background P frames based on auto regressive coefficients and thread information in the encoded video sequence. In an embodiment, the system further comprises: means for modifying the estimated object appearance based on object residual information in the encoded video sequence. In an embodiment, the system further comprises: means for compensating for object motion based on object motion parameters in the encoded video sequence. In an embodiment, the means for decoding background I frames comprises an H.264 I slice decoder configured to decode background I frames and an H.264 P slice decoder configured to decode edge blocks of background P-frames and the means for generating background P frames is configured to generate background P frames based on the auto regressive coefficients, the thread information and the decoded edge blocks. In an embodiment, the system further comprises: means for splitting the encoded video sequence into: encoded H.264/AVC information; AR coefficients and thread information; and object appearance and motion parameters and compressed object residue information. In an embodiment, the means for generating background P frames is configured to, when an error criteria is satisfied, output a previous background P block as a current background P block. In an embodiment, the system further comprises: a digital video encoder, including: means for segmenting frames in a digital video sequence into object regions and background regions; means for generating object motion and appearance parameters based on segmented object regions; and means for generating an auto regressive background model based on segmented background regions.

The foregoing objects, features, and advantages will be discussed in detail in the following non-limiting description of example embodiments in connection with the accompanying drawings.

BRIEF DESCRIPTION OF THE SEVERAL VIEWS OF DRAWINGS

The foregoing and other purposes, features, aspects and advantages will become apparent from the following detailed description of embodiments, given by way of illustration and not limitation with reference to the accompanying drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In this disclosure an embodiment of a video compression technique is proposed that may be configured to exploit both the perceptual redundancy present in a texture (or a slowly changing/static background) and the capabilities of appearance based object coding.

Figure 1:
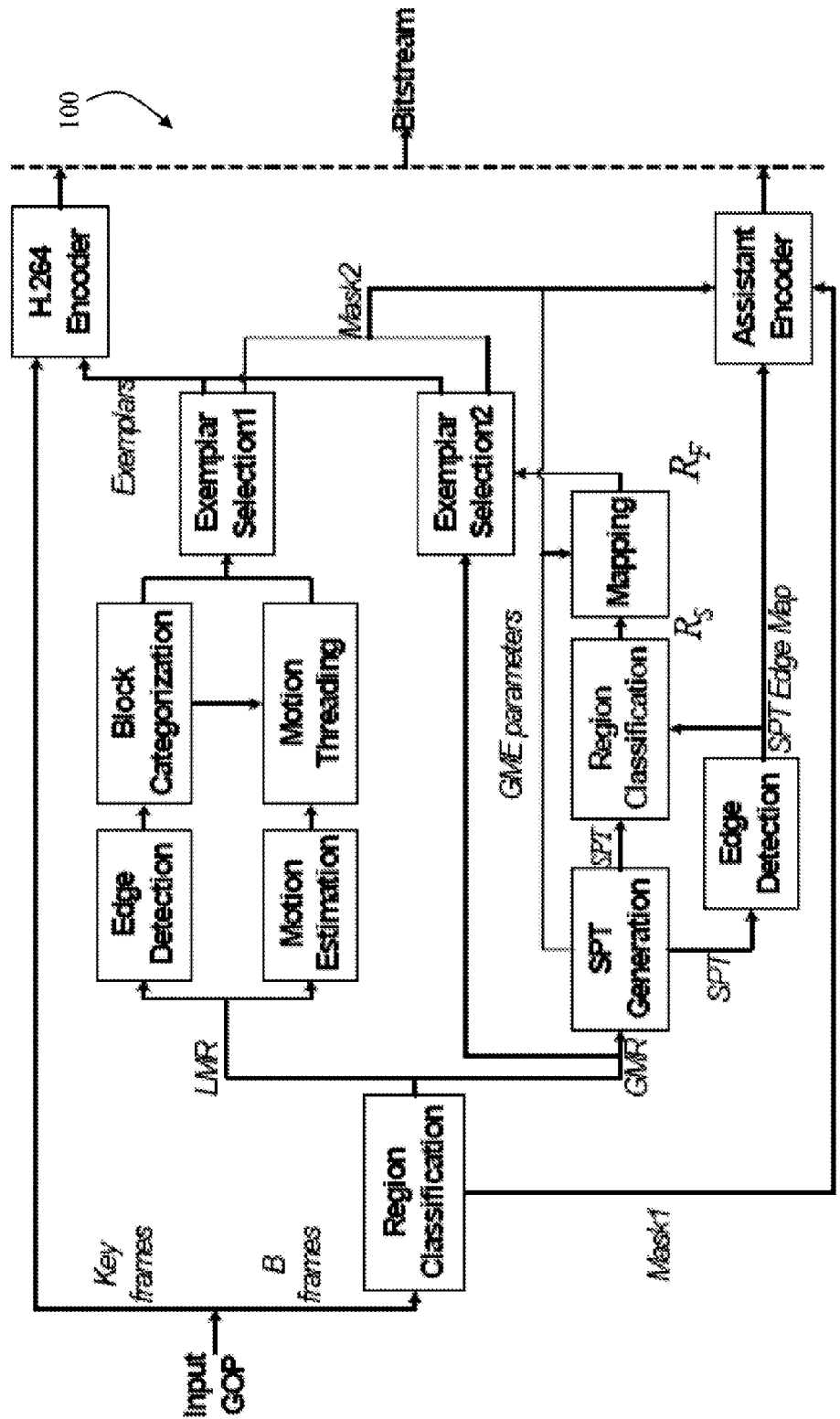
FIG. 1 shows an encoder configured to employ a coding paradigm based on independent characterization of local motion regions (LMR) and global motion regions (GMR).
Figure 2:
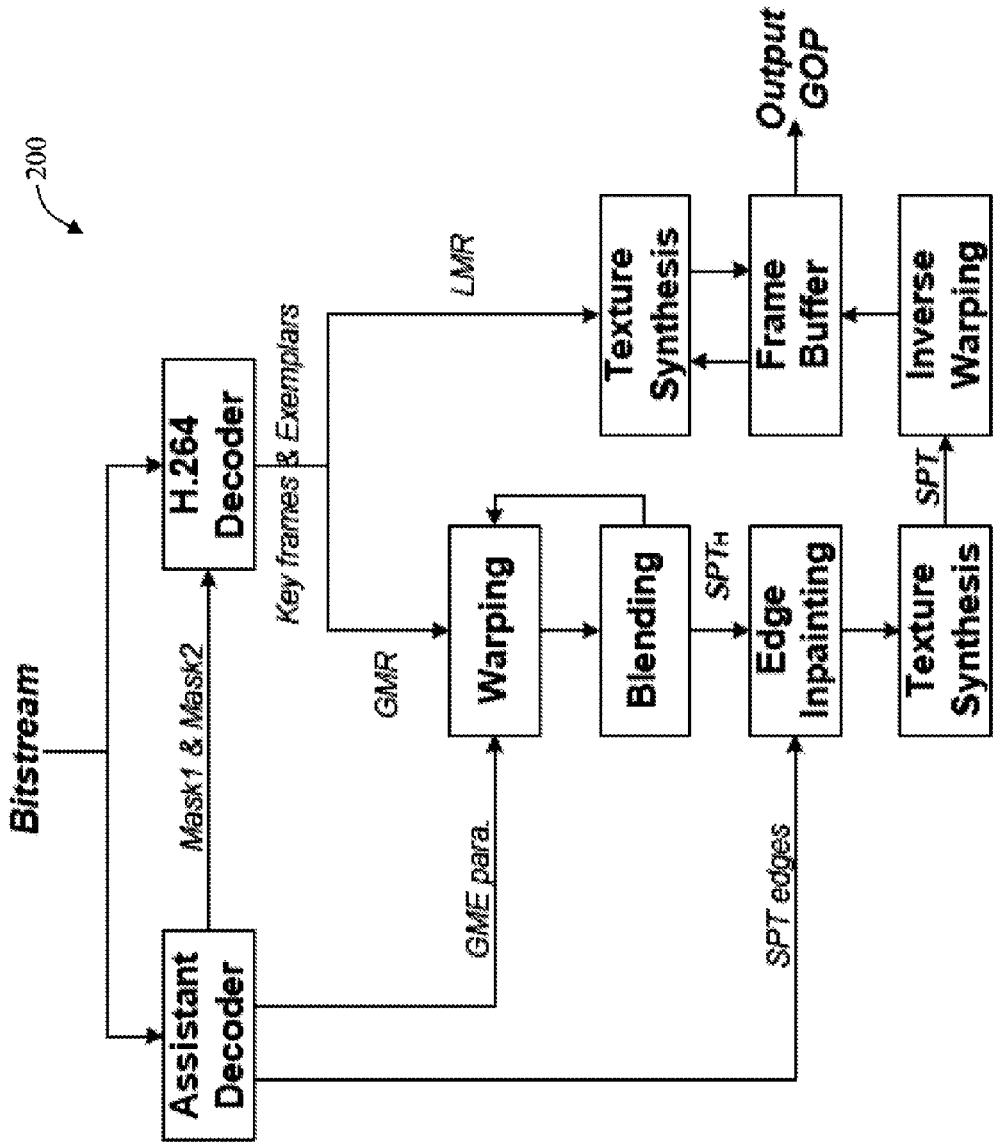
FIG. 2 shows a decoder configured to decode a signal from the encoder of FIG. 1.

Zhu, et al., have proposed a coding paradigm with an encoder architecture based on characterization of local motion regions (LMR) and global motion regions (GMR). See C. Zhu, X. Sun, F. Wu, H. Li, "Video coding with Spatio-temporal texture synthesis and Edge-based inpainting," ICME 2008, pp. 813-816, 2008. Exemplars are chosen from both the LMR and the GMR regions. In LMR region blocks are divided into structural blocks and textural blocks. The structural blocks are exemplars coded with H.264 encoder, and the textural blocks are motion threaded, some of the motion threads are chosen as exemplars and others are removed. Sprite based generation is used for selecting the exemplars in the GMR. Exemplars are coded/decoded with a usual H.264 encoder/decoder. FIGS. 1 and 2 illustrate an encoder 100 and a decoder 200 configured to employ a coding paradigm based on characterization of local motion regions (LMR) and global motion regions (GMR). While the non-exemplar blocks in the LMR region are reconstructed using an extension of the patch-wise inpainting, GMR blocks are reconstructed using warping and blending and filling 'holes' using inpainting. The scheme is applied to B-frames. In addition, reconstruction in Zhu is based on inpainting, warping and blending, which are computationally intensive operations.

In an embodiment as described herein, all object blocks (in all frames) and most background blocks in the P-frame may be encoded using parametric coding techniques, resulting in potentially higher compression. Instead of reconstruction based on inpainting, warping and blending, model parameter based reconstruction may be employed, which has low computational complexity, and the decoder is hence more amenable to real-time applications. The encoder first segments the frame into moving object and background. These two segments are then independently encoded. The segmentation may be achieved by using a moving object segmentation method based on principle component analysis (PCA).

In an embodiment, the background region of a frame is divided into 16×16, non-overlapping blocks. In some embodiments, different block sizes may be employed. In some embodiments, overlapping blocks may be employed. Each block is then classified as an edge or a non-edge block, for example, by a gradient-based edge detector. To preserve edge information and transitions among different regions, edge blocks may be encoded using, for example, a standard H.264/AVC P slice encoding scheme. The remaining blocks of the background region (called the texture blocks) are then motion threaded and each thread is modeled using a 3-D auto regressive (AR) model. The selected texture regions in a video may be reconstructed from their spatio-temporal neighbors without significant loss of visual quality. The object is encoded using the projection coefficients to the orthonormal basis of the incrementally learnt Eigen subspace (used for appearance based object tracking).

The system extracts an arbitrary shaped object in the video frames and segments the frames into object and background regions. The moving object may be detected, for example, by analyzing the first three frames in the following manner.

First, an improved principal component analysis technique is used to adapt the motion detection. The definition of traditional covariance matrix is modified to $$C = (X1-X2)^T(X1-X2) + (X2-X3)^T(X2-X3) + (X1-X3)^T(X1-X3) \quad (1)$$

where, Xi is a one dimensional vector obtained by vectorizing the frame i in the sequence. The calculation result may be improved to obtain a good initialization of the object's bounding box, as discussed in more detail below. After segmentation the object and background regions are fed into different encoding paths as illustrated in FIG. 3, discussed in more detail below.

For each frame, the encoder codes the estimated object by projection coefficients onto the learnt subspace and motion parameters. The coded video stream, at each time instance, contains the compressed object difference image and the motion and appearance parameters in the subspace of the object.

For encoding the background, I-frames are coded, for example, using H.264/AVC I slice coder and P-frames are encoded as follows. The background region of each P-frame is divided into blocks, such as non-overlapping 16×16 blocks. Each block is classified as an edge or a non-edge block. For example, a gradient-based edge detector may be used to classify each block as an edge or a non-edge block. To preserve edge information and transitions between object and background regions, edge blocks are encoded by using, for example, a standard H.264/AVC P slice encoder. The remaining blocks (called the texture blocks) are processed further. Block-based motion threading is performed on texture blocks and each of the threads is represented using a spatio-temporal AR model. To account for the cases where the performance of AR model is not satisfactory, residues may be calculated for each block to be synthesized and energy of residues compared to a threshold. If the energy exceeds the threshold that block may be encoded using, for example, H.264. The coded bitstream includes these coefficients and the motion thread information.

Figure 3:
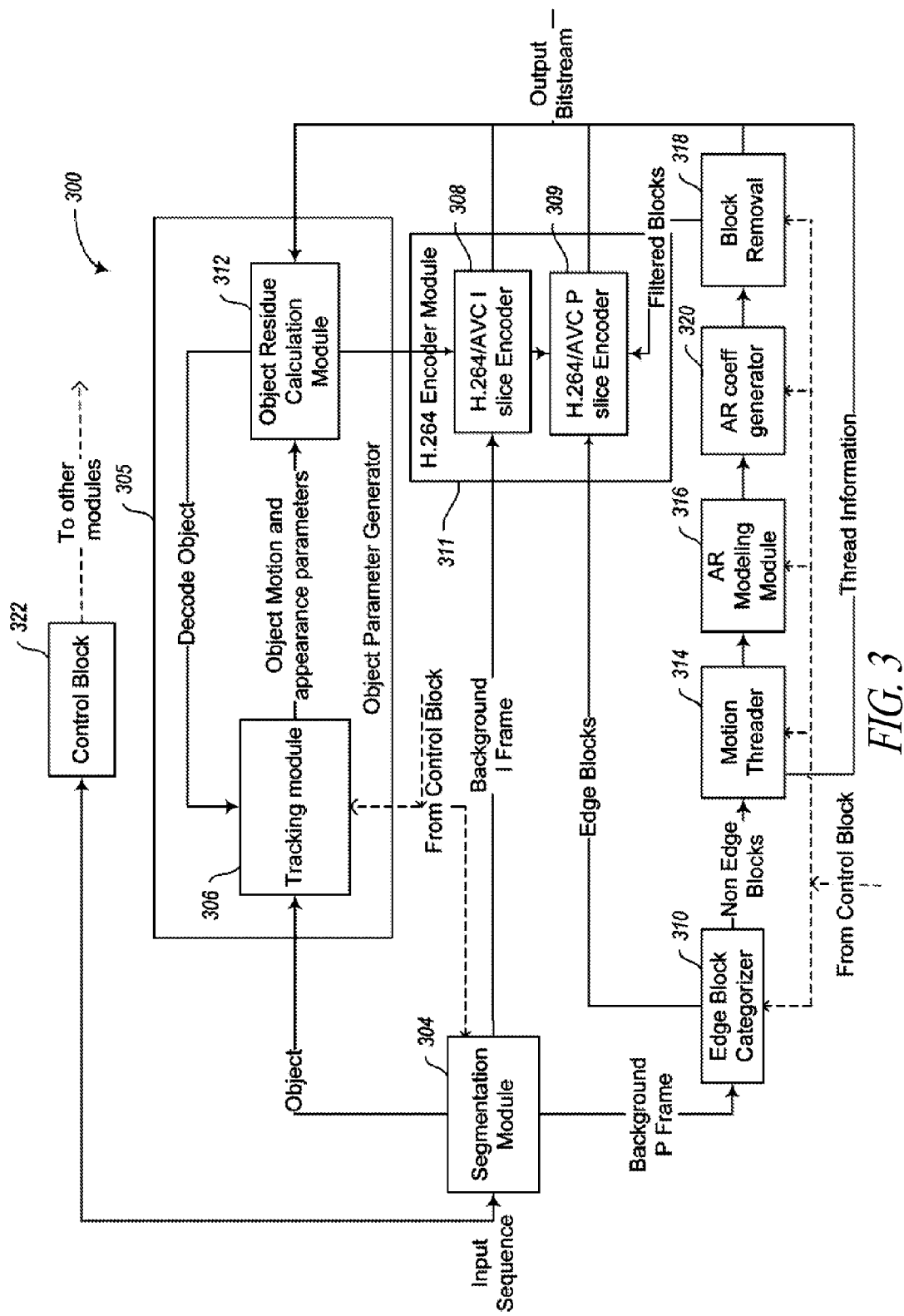
FIG. 3 shows an embodiment of an encoder configured to use parametric encoding for object regions and AR modeling for non-edge blocks of background P frames.

FIG. 3 shows a block diagram of an embodiment of an encoder 300. The encoder has a moving object segmentation module 304 which is configured to receive a input sequence of video frames, extract an arbitrary shaped object in the video frames and segment the frames into object and background regions. The segmentation module 304 is coupled to a tracking module 306, a standard encoding module such as an H.264/AVC I slice encoder 308, and an edge block categorizer 310.

The segmentation module 304 is configured to provide the extracted object region to an object parameter generator 305. As illustrated, the object parameter generator 305 comprises the tracking module 306 and an object residue calculation module 312. The tracking module 306 is configured to generate object motion and appearance parameters and provide the object motion and appearance parameters to the object residue calculation module 312. The object residue calculation module 312 is configured to provide decoded object feedback to the tracking module 306 and object residue data to the H.264/AVC I slice encoder 308. The tracking module 306 is configured to generate the object motion and appearance parameters based on the extracted object region received from the segmentation module and the decoded object received from the object residue calculation module 312. The object residue calculation module 312 is configured to generate object residue data for the H.264 I slice encoder 308 based on the object motion and appearance parameters and the object region. For each frame, the object residue calculation module 312 is configured to code an estimated object by projection coefficients onto a learnt subspace and motion parameters. The coded video stream, at each time instance, contains the compressed object difference image and the motion and appearance parameters in the subspace of the object.

The segmentation module 304 is configured to provide background I frame regions to the H.264 I slice encoder 308 and to provide background P frame regions to the edge block categorizer 310. The edge block categorizer 310 is configured to categorize background blocks of the P frames as edge blocks or non-edge blocks. The edge block categorizer 310 may be configured, for example, to divide the P frames into 16×16 non-overlapping blocks and to classify blocks as edge blocks or non-edge blocks using gradient based edge detection, and may comprise a gradient-based edge detector. For example, to identify edge blocks a gradient may be used as a measure. Blocks may be classified on the basis of edges since highly structured textures and edges (nonstationary information) are not well synthesized using an AR model. Sobel operators may be applied to find the gradient in x and y direction ($G_x$ and $G_y$ respectively). Then the magnitude of gradient at a given pixel G may be found, for example, as:

$$|G| = \sqrt{(G_x^2 + G_y^2)} \quad (2)$$

To determine whether a given block is an edge block, the magnitude of the gradient over all the pixels in the block may be summed and compared to a threshold. If the sum is greater than the threshold, the block may be classified as an edge block. If the sum is less than the threshold, the sum may be classified as a non-edge block.

The edge block categorizer 310 is configured to output the edge blocks to a standard encoder such as the illustrated H.264 P slice encoder 309 and to output the non-edge blocks to a motion threader 314. As illustrated, the H.264 I slice encoder 308 and the H.264 P slice encoder 309 are integrated into an H.264 encoder module 311. The motion threader 314 is coupled to an auto-regressive (AR) modeling module 316. The motion threader 314 also is configured to generate thread information which is incorporated into the output bitstream of the encoder 300. The AR modeling module 316 also is coupled to a block removal module 318 and an AR coefficient generator 320. The block removal module 318 is configured to identify blocks in a background P frame that have to be removed (the blocks that are not efficiently modeled using AR modeling). The removed blocks are provided to the standard encoding module 309. The AR coefficient generator 320 is configured to generate AR modeling coefficients for the non-edge blocks of the background P frames. As illustrated, the encoder 300 comprises a control block 322 configured to generate control signals for controlling the various modules of the encoder 300. The control block 322 may comprise, for example, a processor and a memory (see FIG. 8), and the memory may contain instructions that when executed by the processor cause the encoder 300 to encode an input digital video stream.

For encoding the foreground, an embodiment of an encoder, such as the encoder 300 shown in FIG. 3, is configured to track objects that change position and/or appearance. The problem may be viewed as estimating a set of eigenspace reconstruction coefficients and restricted affine deformation coefficients, which minimize the reconstruction error on projecting information from a new frame, onto an eigenspace built incrementally. A particle filter-based prediction for a next position of the object is employed, leading to an efficient search procedure for the object of interest. Further, the overhead of non-linear optimization may be avoided. A sampling-based optimization procedure may be employed. An efficient incremental eigenspace update mechanism is employed for objects.

After segmenting the object region in the first frame of the image sequences, the object is tracked using an efficient tracker which is initialized in the first frame. For all subsequent frames, measurements are obtained (for example, minimum distant prediction from the learnt sub-space is taken as the description of the tracked object). Then an incremental update of the eigen-spaces is done. The motion parameters values for the next frame are predicted. For each frame, the encoder codes the estimated object using the projection coefficients and motion parameters. Eventually the bit stream for the object part is generated and it contains the compressed object difference image (residue) and the motion and appearance parameters in the subspace of the object. To maintain acceptable perceptual quality even for low bitrates, the object residual may be sent over different scales equivalent to sub-bands. A higher scale means more detail.

An appearance-based object tracker can track moving objects undergoing appearance changes powered by dimensionality reduction techniques. The Isard and Blake condensation algorithm (See M. Isard and A. Blake, "Condensation—Conditional Density Propagation for Visual Traking," Intl J. Computer Vision, Vol. 28, No. 1, pp. 5-28 (1998)) can represent simultaneously multiple hypothesis. There are several ways an eigen tracker and particle filter can be combined. See Namita Gupta, Pooja Mittal, Kaustubh S. Patwardhan, Sumantra Dutta Roy, Santanu Chaudhury and Subhashis Banerjee, "On Line Predictive Appearance-Based Tracking," Proc. IEEE Intl Conf. on Image Processing (ICIP 2004), pp 1041-1044; Kaustubh Srikrishna Patwardhan, Sumantra Dutta Roy, "Hand gesture modeling and recognition involving changing shapes and trajectories, using a Predictive EigenTracker," Pattern Recognition Letters, vol. 28, no. 3, pp. 329-334, February 2007. These approaches have the overhead of non-linear optimization. A fast appearance tracker which eliminates non-linear optimizations completely has been proposed. See Jeffrey Ho, Kuang-Chih Lee, Ming-Hsuan Yang, David Kriegman, "Visual Tracking Using Learned Linear Subspaces," Proceedings of the 2004 IEEE Computer Society Conference on Computer Vision and Pattern Recognition (CVPR'04), Vol 1 pp. 782-789. This approach lacks the benefit of predictive framework.

An embodiment of a method for object tracking is described below. The method may be employed, for example, by the embodiment of an encoder such as the encoder 300 of FIG. 3. The capabilities of eigen tracking are enhanced by augmenting it with a condensation-based predictive framework to increase its efficiency and also increasing speed by avoiding non-linear optimization. Thus, an embodiment employs tracker initialization, a prediction framework, an effective subspace update algorithm and avoidance of non-linear optimizations.

The tracking area may be described by a rectangular window parameterized by $$[x_t, y_t, w_t, h_t, \theta_t],$$

and modeled by a 7 dimensional state vector $$X_t = [x_t, x'_t, y_t, y'_t, w_t, h_t, \theta_t], \quad (3)$$

where $(x_t, y_t)$ represents the position of the tracking window, $(w_t, h_t)$ represents the width and height of the tracking window, $(x'_t, y'_t)$ represents the horizontal and vertical component of the velocity and $\theta_t$ represents the 2D rotation angle of the tracking window. These five motion parameters can track the object with its bounding box being an oriented rectangle. This seed point is used for sampling windows around it. The predictive framework helps generate better seed values for diverse object dynamics. A simple first-order AR process may be employed to represent the state dynamics (t represents time):

$$X_t = A_t X_{t-1} + w_t \quad (4)$$

where $w_t$ is a zero-mean, white, Gaussian random vector. The measurement is the set of five motion parameters obtained from the image, $Z_t$. The observation model has Gaussian peaks around each observation, and constant density otherwise. The values of the five motion parameters are estimated based on their predicted values and the measurements done. These estimated values serve as seeds to the next frame. For every frame, a sampled version of conditional state density $(S_t)$, and corresponding weights $(\Pi_t)$ for conditional probability propagation or condensation are obtained. The state estimate is used to generate the predictions for the next frame. See N. Gupta, et al., "On Line Predictive Appearance-Based Tracking," Proc. IEEE Int'l Conf. on Image Processing (ICIP 2004), pp. 1041-1044, which discusses a predictive Eigen tracker.

An embodiment of a coding solution can detect the most moving object automatically by analyzing the first three frames, i.e. with the overhead of additional two frames buffering at the beginning of the tracking process which is quite acceptable. A moving object segmentation method based on the improved PCA may be employed. This technique works well when the background is still or changing slowly such as grassplot or cloud for the analyzing frames. The principle component analysis is improved to adapt to the motion detection. The definition of traditional covariance matrix is modified to Equation 1, set forth above. Secondly, the calculation result is improved in the following way. Say, E1 and E2 as the first two eigenvectors calculated. The element wise product of these two eigenvectors is:

$$E = E1 \times E2 \quad (5)$$

E effectively eliminates the blur of the eigen images of the moving object. And after formation of E, a simple thresholding usually gives a good initialization of the object's rectangular bounding box.

In most tracking problems, the object of interest undergoes changes in appearance over time. It is not feasible to learn all possible poses and shapes even for a particular domain of application, off-line. Therefore, the relevant Eigen spaces are learned and updated on the fly. Since a naive $O(mN^3)$ algorithm (for N images having m pixels each) is time-consuming, an optimal incremental principal component analysis of $O(mNk)$ algorithm (for k most significant singular values) may be used. See, Juyang Weng et al., "Candid Covariance-Free Incremental Principal Component Analysis," IEEE Transactions on Pattern Analysis and Machine Intelligence, Vol. 25(8), pp. 1034-1040 (2003).

The IPCA method converges to the true eigenvectors in fewer computations than PCA. See Y. Zhang and J. Weng, "Convergence Analysis of Complementary Candid Incremental Principal Component Analysis," Technical Report MSU-CSE 01-23, Dept. of Computer Science and Eng., Michigan State Univ., East Lansing (August 2001).

In the first frame, the tracker is initialized as discussed above. For subsequent frames, the next step is to obtain the measurements—taking the minimum distant prediction from the learnt sub-space (in RGB plane) as the description of the tracked object. Then the eigen-spaces are updated incrementally. The motion parameters values are then predicted for the next frame. Having a computationally inexpensive update algorithm is useful if the tracking algorithm is expected to run in real-time.

Figure 4:
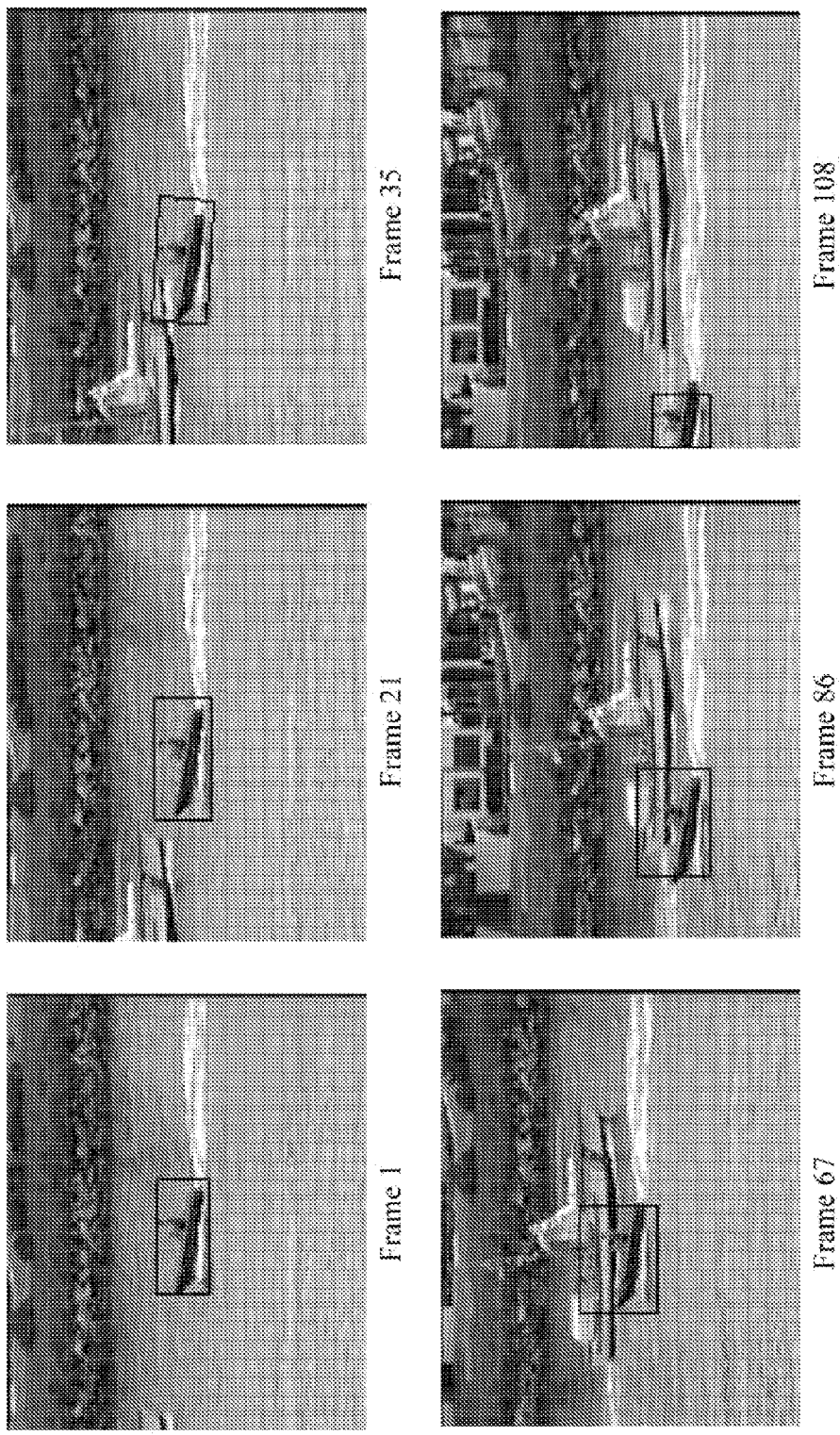
FIGS. 4-6 show example frames from image sequences.
Figure 5:
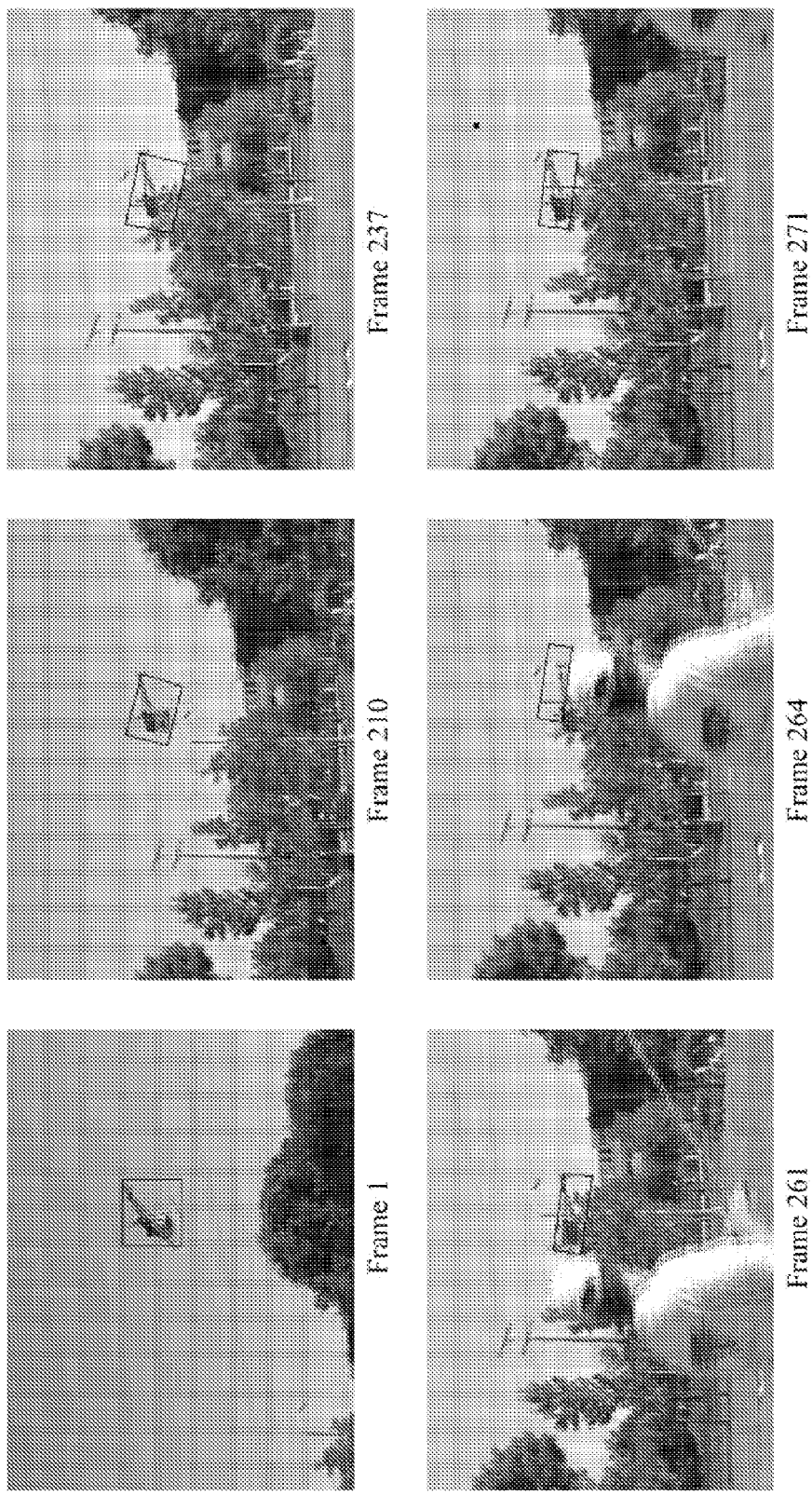
Figure 6:
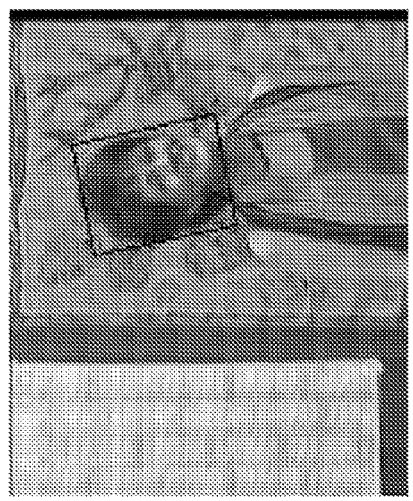
Figure 6:
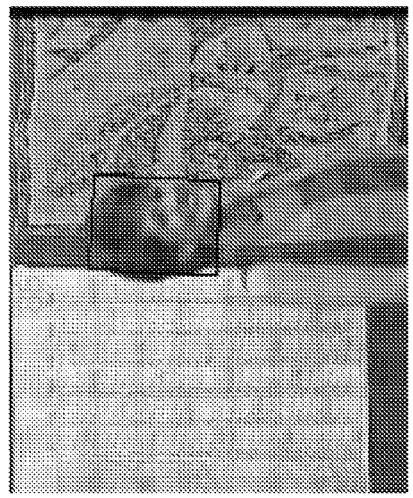
Figure 6:

The computational complexity of the algorithm is dominated by the number of windows generated from the sampling. Appearance-based trackers do not handle situations like sudden pose or illumination changes or full occlusion well, but they can handle partial occlusion and gradual pose or illumination changes well. FIGS. 4-6 show example frames from example image sequences that can be well handled by an embodiment of the encoding scheme discussed herein.

The test cases contain scenarios which a real-world tracker encounters, including changes in appearance, large pose variations, significant lighting variation and shadowing, partial occlusion, object partly leaving field of view, large scale changes, cluttered backgrounds, and quick motion resulting in motion blur. Table 1 below compares a predictive and non-predictive framework for a video sequence of a boat called "coast guard" (See FIG. 4) and a video sequence of a person called "hall." In each case, N=150 windows sampled.

TABLE 1

Comparison of Predictive and Non-Predictive Tracking

| Video | Frames Tracked with no prediction | Frames tracked with prediction | Average time/frame no prediction | Average time/frame with prediction |
|---|---|---|---|---|
| Coast Guard | 80 | 100 | 4.2 Seconds | 4.2 Seconds |
| Hall | 82 | 112 | 4.5 Seconds | 4.6 Seconds |

As shown in the above table, incorporation of a predictive framework makes the tracker more robust. The "coast guard" sequence has presence of the boat up to frames 100 out of total 300 frames and then it disappears. In the "hall" sequence, a person (tracking object) appears in frame 25 and disappears after 140th frame, and in that interval it changes poses heavily. If the number of windows to be sampled is increased by 250, no prediction framework (with almost double time complexity) shows almost similar robustness to that of a predictive framework with 150 samples.

In an embodiment, explicit 2D or 3D models of objects are not required. An embodiment detects and tracks an object in a scene by learning the appearance model of each object online using nontraditional uniform norm based subspace. At the same time the object is coded using the projection coefficients to the orthonormal basis of the subspace learnt. In an embodiment, the tracker incorporates a predictive framework based upon a filter, such as a particle filter, for predicting the five motion parameters. The proposed method of combining tracking with compression gives computational advantage and better compression over existing techniques. For example, the proposed method for object coding shows substantially better compression than traditional DCT-block based video coding especially in low-bitrate applications. Instead of requiring explicit models, in an embodiment the system learns the model for the object using a simple but efficient uniform subspace analysis in a moving average fashion. The basic assumption here is that the appearance space (that includes non-rigid motion, different poses, and views of the object) of an object can be represented by a small number of basis vectors. Compared to other appearance based object coding frameworks, the method is faster and has significantly reduced computational complexity. In conventional approaches, the incremental subspace learning is totally independent of the scheme used for tracking the object. In contrast, in an embodiment a unified approach for tracking and appearance based object coding is employed. In other words, the same subspace used for tracking is reused for the object coding and thus substantially reduces computation time.

In an embodiment, tracking is bootstrapped by automatic detection of the moving object. As discussed above, the moving object can be detected automatically by analyzing the first three frames. After segmenting the object in the first frame of the image sequences, the object tracking is carried out by incorporating the predictive framework in terms of a particle filter (such as a Kalman filter) for the prediction of the five motion parameters. At each frame, the tracker maintains an up-to-date appearance model, and the tracking task becomes a detection problem.

For each frame, the encoder codes an estimated object $O'^n$ by projection coefficients onto the learned subspace and motion parameters. The background is sent as AR coefficients or H.264 I slice coded residual. The coded video stream, at each time instance, contains the compressed information to reconstruct the background, the compressed object difference image $O_d$, and the motion parameters and appearance parameters in the R,G,B subspace of the object. It is to be noted that the appearance parameters need only contain the projection coefficients of the object, rather than the basis vectors of the subspace, since the basis vectors of the subspace can be estimated using the reconstructed objects during decoding at the receiver end.

Figure 7:
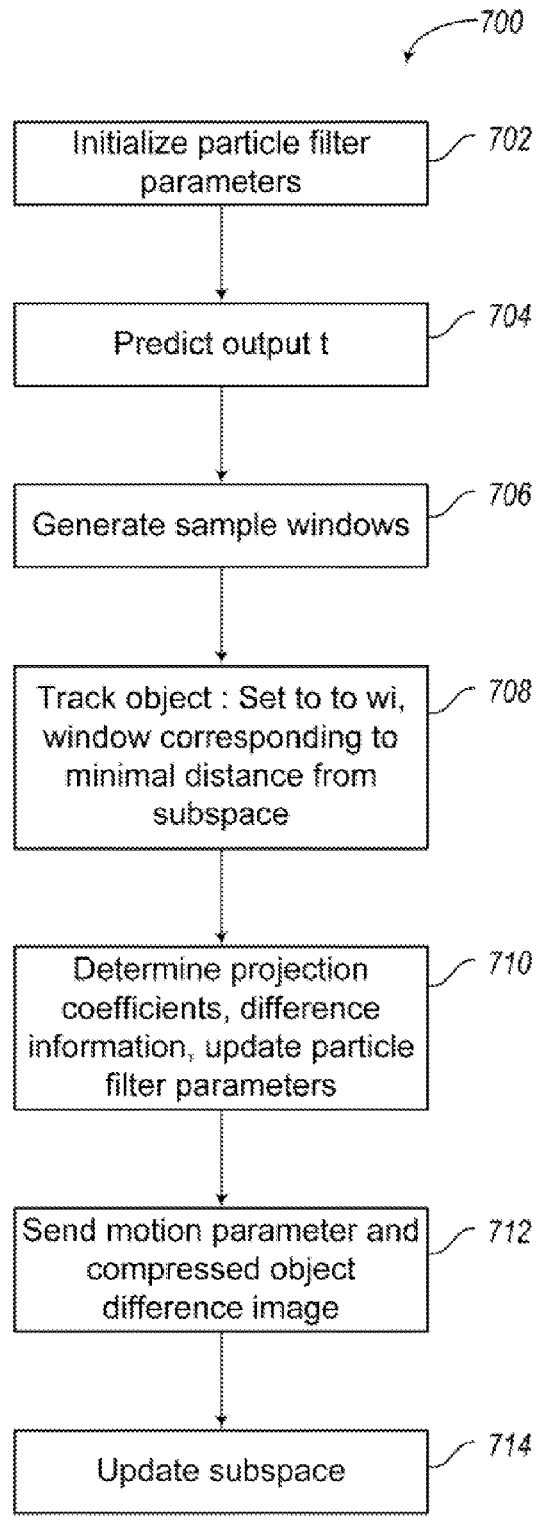
FIG. 7 shows an embodiment of a combined object tracking and coding method.

An embodiment of a combined object tracking and coding method 700 is shown in FIG. 7. The output t is the current state of the tracked object. At 702, the particle filter parameters are initialized. At 704, the output t is predicted using the particle filter, which speeds up the process. At 706, S sample windows {W1, ..., WS} are generated at various locations of different orientations and sizes according to a Gaussian distribution centered at predicted t with a diagonal variance. At 708, the object is tracked. The output t is set to the window corresponding to a minimal distance from the subspace. At 710, the projection coefficient of t to the learnt subspace along with the difference of the predicted and actual t are determined and the filter parameters are updated. At 712, for each frame the residual of t and the projection coefficient are sent as the object into the data stream along with the compressed object difference image. At 714, the subspace is updated. In an embodiment, for the interval of k frames, the observations {x1, ..., xk} are collected from the k previous frames and a subspace update algorithm, for example, a Gram-Smith orthonormalization of the batch means of each size k of the sliding window of length N, is applied.

Figure 8:
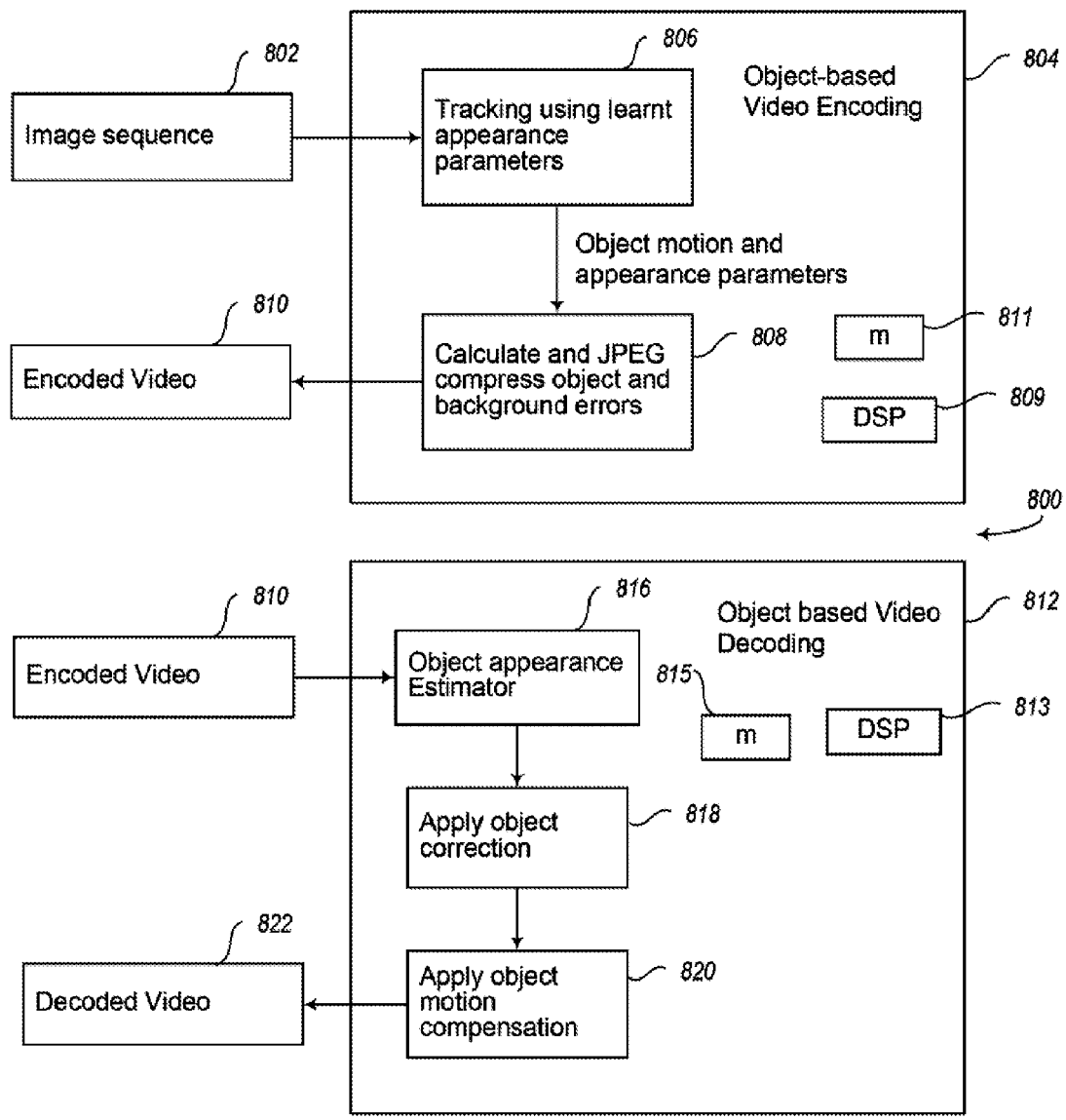
FIG. 8 shows an embodiment of a system for object-based encoding and decoding of an object sequence.

In an embodiment, decoding of the video is achieved by decompressing the first frame and creating an initial object and thus the object's appearance model is initialized. For the subsequent frames, the estimated objects $O'^n$ are obtained through its appearance and motion parameters, and the object estimation error is removed by adding the object difference image $O_d$ to obtain $O'$. Furthermore, the background Bc is reconstructed using decoding of H.264-compatible residual for edge-blocks and using transmitted AR coefficients for non-edge blocks. The video frame is reconstructed by inserting the object $O'$ into the reconstructed background. The object's appearance model is updated by the same way, and the above process is repeated for all the frames. An embodiment of an object-based compression/decompression system 800 is shown in FIG. 8. An image sequence 802 is received by an encoder 804. A tracking module 806 tracks the object using learnt appearance parameters and generates object motion and appearance parameters. The object motion and appearance parameters are used by an object compression module 808 to calculate the object errors, and to provide feedback to the tracking module 806. The encoder 804 produces an encoded video 810. As illustrated, the encoder comprises a digital signal processor 809 and a memory 811. The memory 811 may contain instructions for causing the digital signal processor 809 to perform the functions of the encoder, such as the functions of the tracking module 806 and the object compression module 808. A decoder 812 receives the encoded video 810. An object appearance estimator 816 is configured to estimate an appearance of an object in the encoded video sequence based on the object appearance parameters. An object correction module 818 is configured to correct errors in the estimated object appearance. A motion compensator 820 is configured to apply motion compensation to the object based on the motion parameters. The decoder 812 as illustrated comprises a digital signal processor 813 and a memory 815. The memory 815 may contain instructions to cause the digital signal processor to perform one or more functions of the decoder, such as the functions performed by the object appearance estimator 816, the motion compensator 820, and/or the object correction module 818. A major difference with other parametric approaches is that such approaches have incrementally learned the appearance of the "tracked" object, i.e. they have used features for object tracking and a different subspace for its coding, whereas an embodiment tracks an object by the online learnt subspace which is also used for the coding framework, which leads to a faster encoder. Although the discussion above addressed tracking a single object, the concept can be easily extendible to multiple objects.

As shown in FIG. 3, in an embodiment the background region information is encoded using a 3-D AR model or a standard encoding scheme, such as the H.264/AVC encoding scheme, depending on frame/macroblock characteristics. As illustrated, the I frames are encoded using the H.264/AVC I slice coder and for the P-frames the macroblocks classified as edge and non-edge blocks based on gradient based edge detector. The edge blocks are encoded using the H.264/AVC P slice coder while the non-edge blocks (termed as texture blocks) are encoded using the 3-D AR model. The texture blocks are first motion threaded using the minimizing sum of absolute differences (SAD) measure. The thread is formed by obtaining the closest match of each block in the immediately succeeding frame and then repeating the process for each subsequent frame. 3-D AR modeling is applied to each of the threads to obtain the parameters for the texture. In one embodiment, the Spatio-Temporal auto regressive model given by:

$$s(x, y, t) = \sum_{i=1}^{o} \sum_{j=1}^{p} \sum_{k=1}^{q} \phi_{i,j,k}(x + \Delta x_i, y + \Delta y_j, t + \Delta t_k) + w(x, y, t) \quad (6)$$

may be employed, where, (x, y, t) denotes a location in space-time, w(x,y,t) denotes a three dimensional white Gaussian noise process and Ors are the coefficients of the model. See M. Szummer and R. W. Picard, Temporal texture modeling. Proceedings, International Conference on Image Processing, 3:823-826, September 1996 and M. O. Szummer., Temporal texture modeling., Master's thesis, Massachusetts Institute of Technology, September 1995. The coded bit-stream includes these coefficients and the motion thread information.

In an embodiment, the background region is encoded using a video coding scheme based on parametric compression of texture. Each macro block is characterized either as an edge block, or as a non-edge block containing texture. The non-edge blocks are coded by modeling them as an auto regressive process (AR).

By applying the AR model in a spatio-temporal domain, both spatial as well as temporal consistency may be achieved. Edge blocks are encoded using a standard encoding process, such as the standard H.264/AVC P slice coding. By using the parametric compression of non-edge blocks, up to 54.52% more compression as compared to the standard H.264/AVC at similar visual quality may be achieved.

Exact MMSE (minimum mean square error) reconstruction of texture is not required. A sample from the same random process is sufficient for most applications. Thus by exploiting this property textures can be highly compressed, allowing for greater overall compression at the cost of increased computational complexity. Selected texture regions in a video can be reconstructed from their spatio-temporal neighbors without significant loss of visual quality. The methods for analysis and synthesis of texture can be broadly classified into parametric and non-parametric. Some examples of on-parametric approaches are Markov random field based sampling and inpainting based approaches. While non-parametric methods tend to perform better in terms of visual quality of results, they lag behind parametric methods in terms of compression and reduced computational complexity. By parametrically coding texture a larger compression ratio is attainable. An embodiment uses a simple block selection criteria and an auto regressive model for modeling of texture motion threads. The advantages of using an AR model are that more blocks can be removed than inpainting thus ensuring more compression and also AR models are computationally much less intensive as compared to non-parametric methods.

Image sequences of moving textures can be modeled by Spatio-Temporal Autoregressive models (STAR). AR models however, do not model structured areas (non-stationary information) well. Hence for identifying blocks which can be synthesized by AR model an edge based criteria is employed. To ensure that the moving sequences being modeled have an AR characteristic, motion threads are modeled by AR. Motion threading is a technique that can efficiently handle motion information in a video. Blocks are said to be similar if they satisfy a certain criteria (for example, MMSE). Macroblock based forward motion estimation is performed from first to last frame resulting in a thread like structure. Thus the volume to be modeled by AR is selected by motion threading.

The spatio-temporal auto-regressive model provides many advantages over non-parametric approaches (inpainting, Markov Random Field models etc.). Reconstruction via AR is computationally much less intensive. Also AR needs only a few coefficients to generate arbitrarily large texture area, however, parametric methods use a data image large enough to capture all the features of the texture thus restricting the number of blocks that can be removed from a video sequence.

Two criteria are determined when applying the AR model. First is model identification (select model order) and second is the parameter estimation scheme. Model order is determined by examining the three dimensional auto correlation function. If the correlation falls steeply small AR model orders are better. On the other hand wide correlation curves present greater challenge in selecting the AR model order.

Figure 9:
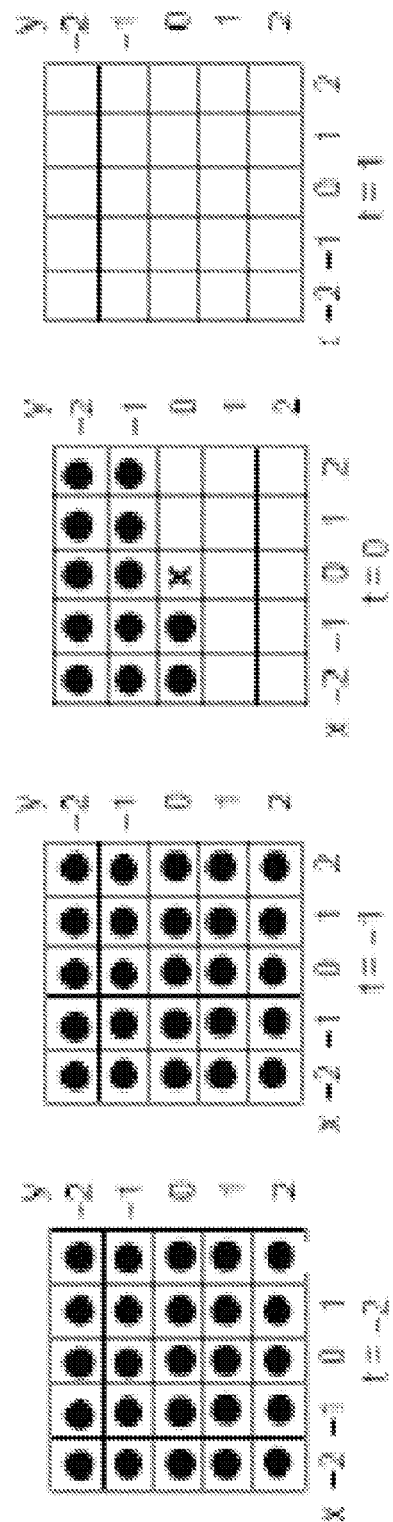
FIG. 9 shows an example of a casual neighborhood.

For the model to be practically implementable, the AR model should be causal. In case of causal STAR models, conditioning neighborhoods are only a subset of the spatio-temporal volume. The neighborhood corresponds to a recursively computable filter. An example of a causal neighborhood is shown in FIG. 9. The block under consideration (at t=0) can use only spatially causal pixels in both x and y directions in the same frame. However, it can use all the pixels from the previous frame which is temporally causal. Thus in case of causal STAR model a subset of all the neighbors is used. For estimation purposes the criteria is to minimize the mean square error, i.e., an expression for the error is minimized with respect to the coefficients.

Synthesis for causal STAR models is straightforward. First, the boundaries of the volume are initialized. Here, Gaussian random noise is used, but almost anything will do, since the initial conditions die out gradually. For synthesis, each pixel is predicted as a linear combination of its (already synthesized) neighbors and of Gaussian random noise with the same variance as the innovation process w(x).

In an embodiment, I-frames are coded using H.264/AVC I slice coder and P-frames are encoded using a combination of H.264/AVC P slice coding and AR modeling. Thus all the compression over H.264 is achieved in P frames. Each P-frame is divided into non overlapping 16×16 blocks. Each block is then classified as an edge or a non-edge block by means of a gradient based edge detector. To preserve edge information and transitions among different regions, edge blocks are encoded by standard H.264/AVC P slice coder. The remaining blocks (called the texture blocks) are then processed further using the proposed scheme. Block based motion threading is performed on texture blocks and each of the threads is modeled as AR process using 3-D AR model. The coefficients so obtained are sent along with thread information at the encoder side. For each of the blocks (to be synthesized by AR) a search is performed to determine if the initial condition pixels (taken from causal neighborhood) have an edge. Presence of edge implies that these pixels cannot be used to initialize the model and so the block under consideration is treated as an edge block and encoded by H.264. To account for the cases where the performance of AR model is not satisfactory, residues are calculated for each block to be synthesized and energy of residues is found. If the energy exceeds a threshold, the block is treated as an edge block and encoded using H.264 P slice coder. The overall approach has been summarized in FIG. 3. The implementation details of an embodiment of an AR model are described below.

In any texture reconstruction scheme, isolation of the region that can be successfully synthesized is very significant for good reconstruction. Hence selection of blocks for encoding by proposed scheme becomes an important criterion in the encoder. In an embodiment, a block based categorization has been done to identify the regions amenable to reconstruction via AR model.

For identifying edge blocks a gradient may be used as the measure. Here classification may be done on the basis of edges since highly structured textures and edges (non stationary information) are not well synthesized using AR models. To determine whether a given block is edge block or not, the magnitude of gradient over all the pixels in that block is summed. If the sum is greater than a given threshold, the block is categorized as edge else it is classified as a non edge texture block, which can be removed.

Figure 10:
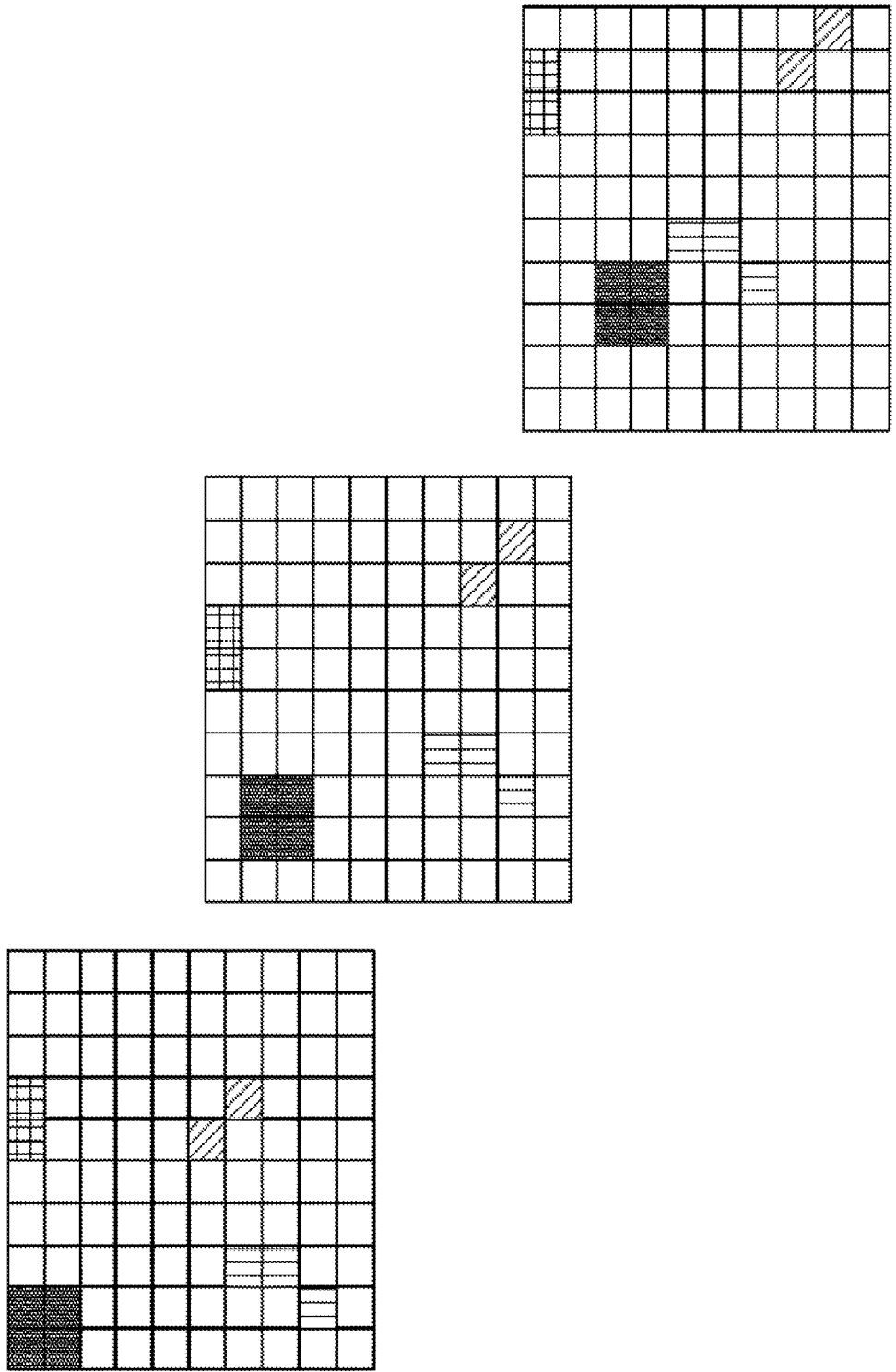
FIG. 10 shows an example of motion threading.

To avoid possible temporal inconsistency in the synthesized result, motion estimation may be employed at the encoder side. Temporally sequential blocks on a motion trajectory are treated as a candidate for texture synthesis via the same AR model. In this way, texture synthesis can be performed on a more global level to help spatial and temporal consistency. Block based backward motion estimation may be performed on non edge blocks only. Since the edge blocks are coded with H.264 there is no need to explicitly handle motion compensation for them. The motion compensation for edge blocks is being handled by H.264. Thus, each type of blocks may be motion compensated among their own category. A criteria for motion threading is minimizing sum of absolute differences (SAD). For creating the thread closest match of each block is found in immediately preceding frame and so on. Integer-pixel accuracy is maintained in motion threading. Afterwards AR modeling is applied on each of the threads. FIG. 10 shows an example of motion threading. The blocks having the same hatching are similar according to chosen criteria and hence belong to the same thread.

Each of the threads found in the previous step are modeled using the Spatio-Temporal Auto-Regressive Model. As discussed previously, this model is a three dimensional version of the regular AR model. Every pixel is modeled as a linear combination of neighboring pixels in time and space plus a noise term. The coefficients are sent along with other data to the decoder.

Synthesis of blocks using AR model is not satisfactory if the initialization pixels are not of the same texture type or the block cannot be effectively modeled as AR. An example of such a block is one having non stationary data. To ensure that these blocks do not deteriorate the quality of reconstruction, an approach has been developed to isolate and encode them via standard encoding, such as H.264 P slice coding. For each block to be generated we detect if the pixels used to provide initial conditions have an edge. Edge detection may be performed by using the gradient based approach discussed previously. If an edge is present, it implies that the initialization pixels are not all of the same type as the texture in block and so they cannot be used to initialize the model. Hence, the block is instead treated as an edge block and encoded using H.264 P slice coder. To detect cases where performance of AR model is not good despite proper initialization, the blocks may be locally decoded and residues found by inverse filtering the motion thread.

If the residue energy exceeds a threshold, the block is encoded using, for example, H.264 P slice coder. The threshold for residue energy may be kept high to ensure that only blocks with significant distortion are removed. Removal of blocks in the manner suggested above helps in maintaining the visual quality of reconstruction.

In an embodiment of a decoder, I frames and the background edge and filtered blocks of P frames are reconstructed by H.264 decoder. The remaining P frame background blocks are then synthesized via the AR model. After texture synthesis, completed pictures are stored to be used for decoding subsequent pictures. Note that the texture regions may be reconstructed using the I frame in the group of frames which was coded and reconstructed with MSE criterion in H.264 I slice coder. The motion thread information indicates which blocks are to be synthesized via AR model. For synthesis the following steps are carried out. If the error between the block to be synthesized and the preceding block in the motion thread is less than a threshold, then the previous block is simply copied rather than using AR model. This helps in improving fidelity as well as in maintaining temporal consistency. However, if error exceeds the threshold, AR synthesis is used. For each pixel the spatially neighboring pixels in that frame as well as temporally neighboring pixels (according to the motion thread) in the first frame are used. This process is carried out until all the blocks have been regenerated.

Figure 11:
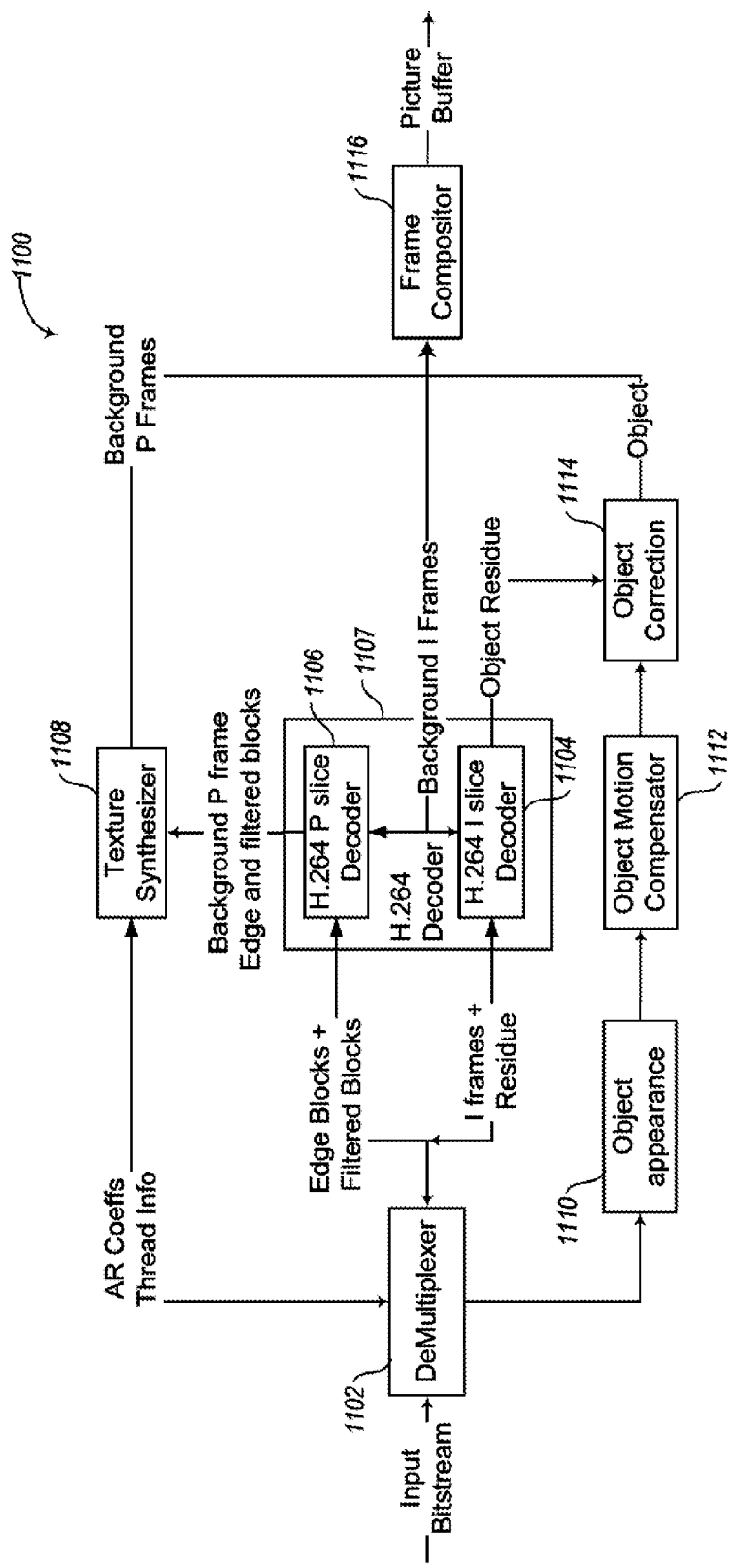
FIG. 11 shows in block form an embodiment of a decoder configured to decode a signal encoded by, for example, the embodiment of FIG. 3.

FIG. 11 illustrates an embodiment of a decoder 1100. At the decoder 1100, a demultiplexer 1102 splits the compressed input bitstream into an H.264 bitstream, AR coefficients, thread information and object information. Background I frames are reconstructed by a H.264 I slice decoder 1104 and the edge blocks of P frames are reconstructed using a H.264 P slice decoder 1106. As illustrated, the H.264 I slice decoder and the H.264 P slice decoder are combined into an H.264 decoder module 1107. Background non-edge blocks are synthesized by a texture synthesizer 1108 which is configured to use the AR coefficients and the thread information to synthesize the background non-edge blocks based on the spatio-temporal AR model. In some embodiments, background non-edge blocks which do not satisfy a criteria may also be reconstructed using the H.264 P slice decoder 1106. The texture regions are synthesized using the information from the decoded I frame (taking motion threading into account) and information from neighboring pixels in that frame. This process is carried out until all the texture blocks have been regenerated. For the object reconstruction, the subspace learning is exactly the same as in the encoder side. So, without sending the basis vectors, using only the transmitted projection coefficients to the learnt subspace, the object may be reconstructed. An object appearance estimator 1110 is configured to estimate an appearance of an object in the encoded video sequence based on the object appearance parameters. An object motion compensator 1112 is configured to compensate for motion based on the transmitted motion parameters and an object correction module 1114 is configured to add the residual decoded by H.264 I slice decoder to the object. As illustrated, the object motion compensator 1112 provides an output to the object correction module 1114. In other embodiments, the object motion compensator 1112 may instead receive an output from the object correction module 1114. In other embodiments, the object motion compensator 1112 and the object correction module 1114 may be combined. A frame compositor 1116 is configured to receive the background I frames, the background P-frame edge blocks, the background P frame non-edge blocks, and the object and to generate a composite output frame.

The experimentation results are as follows:

TABLE 2

Summary of Representative Results

| | | Our Scheme | | Compression | |
| --- | --- | --- | --- | --- | --- |
| Sequence | H.264 | Full Residue | Scale1 residue | full Residue | scale 1 residue |
| container | 307 KB | 288 Kb | 242 KB | 6.19% | 21.17% |
| Sky Diving | 283 KB | 203 KB | 186 KB | 28.27% | 34.28% |

Figure 12:
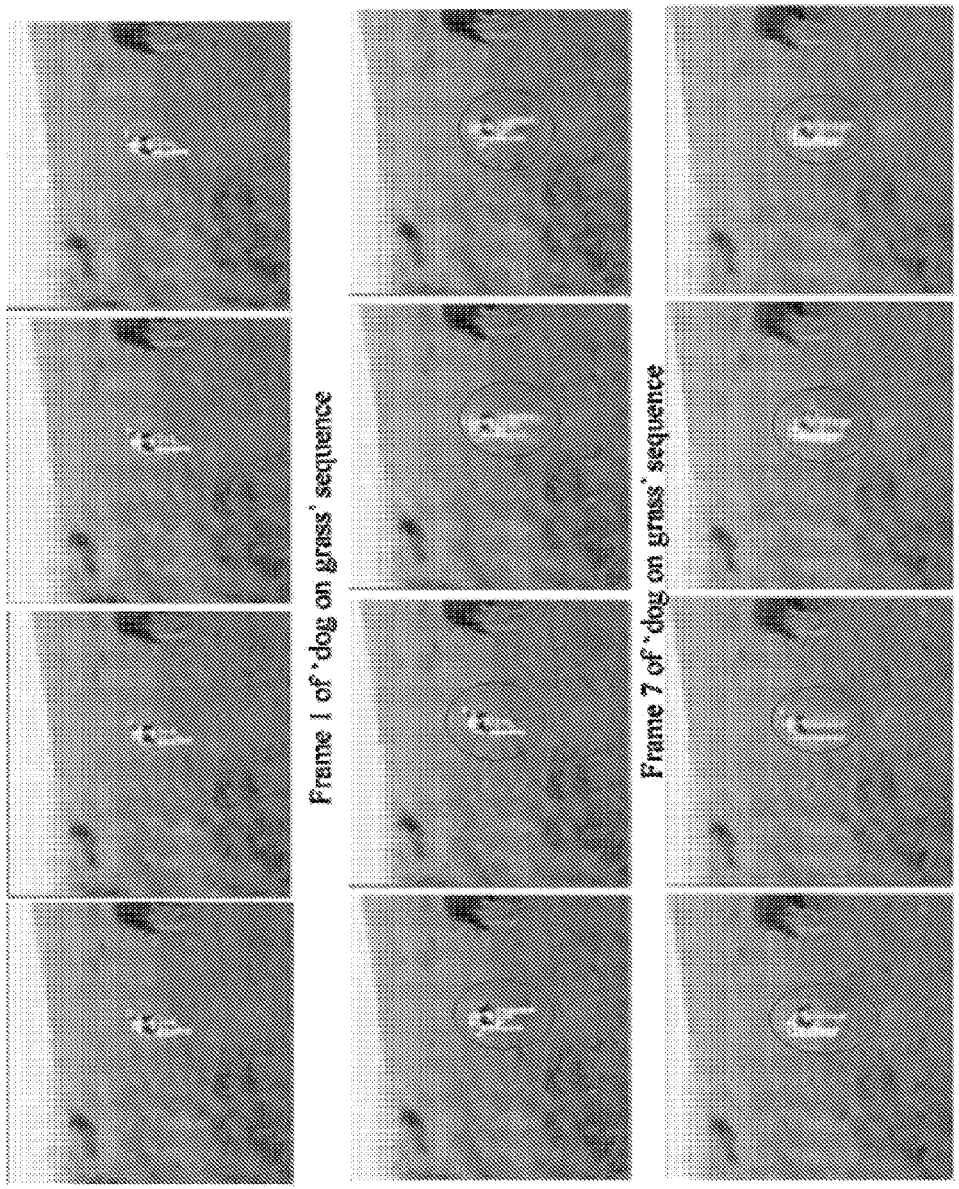
FIG. 12 shows frames of a sequence reconstructed by the proposed scheme as compared to H.264/AVC.

The size of the video has been found by adding the number of bits required for I frames, P frames edge blocks, filtered blocks, AR coefficients and motion threading information, and Huffman encoded parameters for state vector and projection coefficients to the subspace. Some frames of the decoded sequence have been shown in FIG. 12. Columns from left are: (1) Original video, (2) H.264 with maximum possible compression (QP 51), (3) Object coding with maximum possible compression (no residual), (4) Object coding with small bits residual coding (lowest most quality scalability in error residual). These figures show after tracking without using the residual data in the decoder, object reconstruction is quite good in an embodiment. H.264 frame 7 has almost the same object shape as that of the first frame because of insufficient residual, whereas even with no residual object coding an embodiment retains the essence of the object shape. Frame 13 clearly illustrates the superiority of an embodiment of the proposed architecture (as opposed to H.264) for low bitrate coding. The visual quality of the frame reconstructed using standard H.264 is unacceptable, whereas the details of the object are discernible in the reconstructed frame of an embodiment.

The encoder 300 of FIG. 3 may comprise a digital signal processor and a memory containing instructions to cause the encoder 300 to perform the functions of the various modules of the encoder 300 (see the digital signal processor 809 and memory 811 of FIG. 8). Similarly, the decoder 1100 of FIG. 11 may comprise a digital signal processor and a memory containing instructions to cause the decoder 1100 to perform the functions of the various modules of the decoder 1100 (see the digital signal processor 813 and memory 815 of FIG. 8). Some embodiments may combine encoders and decoders into a combined system, such as the encoder 300 of FIG. 3 and the decoder 1100 of FIG. 11. Such a combined system may contain one or more processors and memories configured to perform the various functions of the encoder and decoder.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). In one embodiment, the present subject matter may be implemented via one or more digital signal processors. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital video decoder, comprising:
   a decoding block configured to decode background I frames and edge blocks of background P-frames in an encoded video sequence;
   an object appearance estimator configured to estimate an object appearance based on object appearance parameters in the encoded video sequence;
   a texture synthesizer coupled to the decoding block and configured to generate background P blocks based on auto regressive coefficients and thread information in the encoded video sequence and the decoded edge blocks; and a frame compositor coupled to the decoding block, the object appearance estimator and the texture synthesizer and configured to generate a composite output frame based on outputs of the decoding block, the texture synthesizer and the object appearance estimator.

2. The decoder of claim 1, further comprising:
an object correction module configured to modify the estimated object appearance based on object residual information in the encoded video sequence.

3. The decoder of claim 2, further comprising:
an object motion compensator configured to compensate for object motion based on object motion parameters in the encoded video sequence.

4. The decoder of claim 1, further comprising:
a demultiplexer configured to split the encoded video sequence into:
  encoded H.264 information;
  AR (Auto-Regressive) coefficients and thread information; and
  object appearance and motion parameters and compressed object residue information.

5. The decoder of claim 1 wherein when an error criteria is satisfied, the texture synthesizer is configured to output a previous background P block as a current background P block.

6. A method of decoding an encoded digital video sequence, the method comprising:
decoding background I frames in the encoded video sequence;
H.264/AVC (Advanced Video Coding) decoding edge blocks of background P frames;
estimating an object appearance based on object appearance parameters in the encoded video sequence;
generating background P frames based on auto regressive coefficients and thread information in the encoded video sequence and on the decoded edge block; and
generating a composite output frame based on the decoded background I frames, the estimated object appearance and the generated background P frames.

7. The method of claim 6 wherein estimating the object appearance includes:
modifying the estimated object appearance based on object residual information in the encoded video sequence.

8. The method of claim 7 wherein estimating the object appearance includes:
compensating for object motion based on object motion parameters in the encoded video sequence.

9. The method of claim 6, further comprising:
demultiplexing the encoded video sequence into:
  encoded H.264/AVC (Advanced Video Coding) information;
  AR (Auto-Regressive) coefficients and thread information; and
  object appearance and motion parameters and compressed object residue information.

10. The method of claim 6 wherein, when an error criteria is satisfied, generating a background P frame comprises outputting a previous background P block as a current background P block.

11. A non-transitory computer-readable memory medium whose contents cause a processor to perform a method of decoding an encoded video image sequence, the method comprising:
decoding background I frames in the encoded video sequence;
H.264/AVC (Advanced Video Coding) decoding edge blocks of background P frames; estimating an object appearance based on object appearance parameters in the encoded video sequence;
generating background P frames based on auto regressive coefficients and thread information in the encoded video sequence and on the decoded edge block; and
generating a composite output frame based on the decoded background I frames, the estimated object appearance and the generated background P frames.

12. The non-transitory computer-readable memory medium of claim 11 wherein the method further comprises:
modifying the estimated object appearance based on object residual information in the encoded video sequence.

13. The non-transitory computer-readable memory medium of claim 11 wherein the method further comprises:
compensating for object motion based on object motion parameters in the encoded video sequence.

14. The non-transitory computer-readable memory medium of claim 11 wherein the method further comprises:
demultiplexing the encoded video sequence into:
  encoded H.264/AVC (Advanced Video Coding) information;
  AR (Auto-Regressive) coefficients and thread information; and
  object appearance and motion parameters and compressed object residue information.

15. The non-transitory computer-readable memory medium of claim 11 wherein the method further comprises:
when an error criteria is satisfied, outputting a previous background P block as a current background P block.

16. A system comprising:
a decoder comprising:
  an H.264 I slice decoder configured to decode background I frames in an encoded video sequence;
  an H.264 P slice decoder configured to decode edge blocks of background P frames;
  an object appearance estimator configured to estimate an object appearance based on object appearance parameters in the encoded video sequence;
  a texture synthesizer configured to generate background P frames based on auto regressive coefficients and thread information in the encoded video sequence and the decoded edge blocks of background P frames; and
  a frame compositor coupled to the H.264 I slice decoder, the object appearance estimator and the texture synthesizer and configured to generate a composite output frame based on outputs of the H.264 I slice decoder, the texture synthesizer and the object appearance estimator; and
a digital video encoder.

17. The system of claim 16, further comprising:
an object correction module configured to modify the estimated object appearance based on object residual information in the encoded video sequence.

18. The system of claim 17, further comprising:
an object motion compensator configured to compensate for object motion based on object motion parameters in the encoded video sequence.

19. The system of claim 16, further comprising:
a demultiplexer configured to split the encoded video sequence into:
  encoded H.264/AVC (Advanced Video Coding) information;
  AR (Auto-Regressive) coefficients and thread information; and
  object appearance and motion parameters and compressed object residue information.

20. The system of claim 16 wherein the texture synthesizer is configured to, when an error criteria is satisfied, output a previous background P block as a current background P block.

21. A system comprising:
 a decoder comprising:
  a decoding block configured to decode background I frames in an encoded video sequence;
  an object appearance estimator configured to estimate an object appearance based on object appearance parameters in the encoded video sequence;
  a texture synthesizer configured to generate background P frames based on auto regressive coefficients and thread information in the encoded video sequence; and
  a frame compositor coupled to the decoding block, the object appearance estimator and the texture synthesizer and configured to generate a composite output frame based on outputs of the decoding block, the texture synthesizer and the object appearance estimator; and
 a digital video encoder configured to:
  segment frames in a digital video sequence into object regions and background regions;
  generate object motion and appearance parameters based on segmented object regions; and
  generate an auto regressive background model based on segmented background regions.

* * * * *